Patented July 3, 1923.

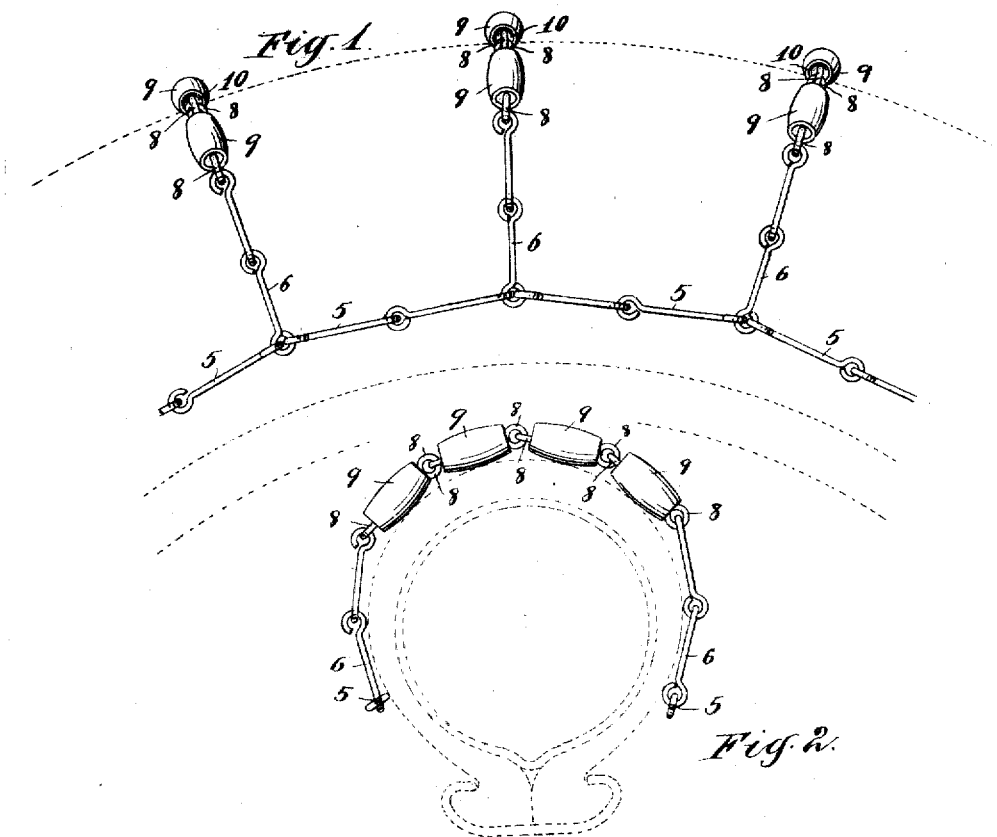

UNITED STATES PATENT OFFICE.

OTTO C. SCHAEFER, OF HOBOKEN, NEW JERSEY.

ANTISKID DEVICE.

Application filed February 8, 1923. Serial No. 617,691.

*To all whom it may concern:*

Be it known that I, OTTO C. SCHAEFER, a citizen of the United States, residing at Hoboken, in the county of Hudson and State of New Jersey, have invented a certain new and useful Improvement in Antiskid Devices, of which the following is a specification.

The invention relates to chain-like structures adapted to be removably secured to the tires of automobile wheels and the like, to prevent skidding on slippery road surfaces, and the object of the invention is to provide a simple, easily manufactured device of this character which shall afford the desired reliable grip on the road-bed without damage to the latter or to the tire, hold effectively and withstand successfully the wear to which such devices are subjected in service.

The invention consists in certain novel features and details of construction by which the above objects are attained, to be hereinafter described and claimed.

The accompanying drawings form a part of this specification and show an approved form of the invention.

Figure 1 is a side elevation showing a section of the device in place upon a tire, the latter being shown in dotted lines.

Figure 2 is a corresponding transverse section and elevation.

Figure 3 is a longitudinal section, on a larger scale, through a group of three adjacent rollers, the links upon which they are mounted being shown in elevation.

Similar reference numerals indicate the same parts in all the figures.

The circumferentially extending side chains lying on opposite faces of the tire adjacent the rim of the wheel, consist each of a series of links 5 composed of a length of heavy steel wire having an eye at each end engaged with the eye of the next succeeding link, and each side chain has provisions, not shown, for connecting and disconnecting its ends to permit attachment to and removal from the tire in any usual or approved manner.

Flexibly joined to adjacent eyes of the links 5 is the end link 6 of a transverse chain similarly joined to the opposite side chain and composed of long wire links 7 having eyes 8 similar to the links 5 and 6, thus producing a series of transverse articulated members extending at intervals across the tread portion of the tire.

Rotatably mounted on each of the links 7 is a gripping member, shown as a roller 9, preferably of hardened steel adapted to engage the road surface and be partially imbedded in the shoe or tire by the weight of the load and thus resist lateral movements of the wheels. The rollers 9 are preferably ellipsoidal or barrel-shaped as shown to present a point or limited area of contact with the roadbed and correspondingly increase the frictional grip thereon, and are bored axially to receive the shafts of the links 7, and provided with semispherical cavities 10 at the ends, in which portions of the connecting eyes 8 are received, thus permitting the rollers to lie in a curve conforming to the transverse curve of the tread with their ends closely adjacent and the eyes protected against external wear.

The ellipsoidal form of the rollers permits partial imbedding in the tread without cutting or undue wear on the shoe or tire, and the flexibility of the linked connections permits peripheral changes of position of the rollers relatively to the tread so that fresh surfaces are presented and the wear on the tread is distributed uniformly.

By mounting the rollers with freedom to rotate on the links 7 new surfaces are presented and the cylindrical form maintained, thus avoiding the formation of angles or cutting edges and the consequent injury to the shoe or tire.

Modifications may be made in the forms and proportions of the links and rollers, and the number of rollers employed in each transverse series may be greater or less than that shown, depending on the size of the shoe and conditions of service.

The device is simple and inexpensive, eminently efficient, and serves successfully without injury to the road surface or to the tire.

I claim :—

An anti-skid device comprising articulated links, and ellipsoidal rollers bored longitudinally with semi-spherical cavities at their ends in which the eyes of the links are received to permit the rollers to lie in a curve conforming to the transverse curve of the tread.

In testimony that I claim the invention above set forth I affix my signature.

OTTO C. SCHAEFER.